Figure 1:
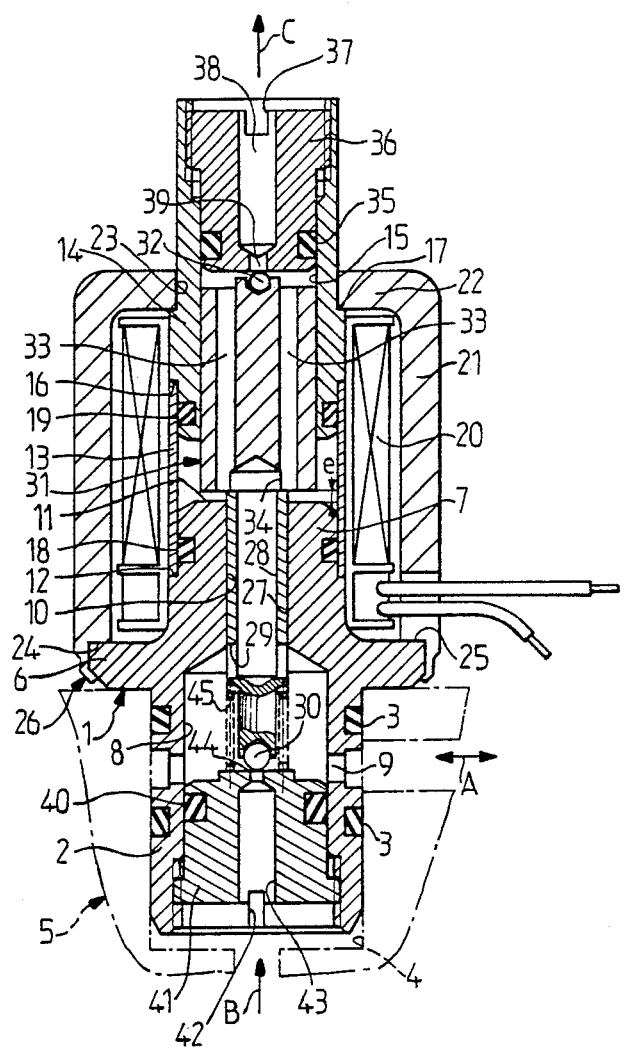

United States Patent [19]

Kervagoret

[11] Patent Number: 4,790,351
[45] Date of Patent: Dec. 13, 1988

[54] SOLENOID VALVE

[75] Inventor: Gilbert Kervagoret, Argenteuil, France

[73] Assignee: Bendix France, Drancy, France

[21] Appl. No.: 183,351

[22] Filed: Apr. 12, 1988

Related U.S. Application Data

[63] Continuation of Ser. No. 24,230, Mar. 10, 1987, abandoned.

[30] Foreign Application Priority Data

Mar. 19, 1986 [FR] France ................................ 86 03938

[51] Int. Cl.⁴ ..................... F15B 13/044; F16K 31/06
[52] U.S. Cl. ................................ 137/596.17; 251/117; 251/129.02; 251/129.07; 251/129.18; 251/129.21; 303/119
[58] Field of Search ............................ 137/596.17, 599; 251/129.02, 129.07, 129.14, 129.18, 129.21, 117; 303/119

[56] References Cited

U.S. PATENT DOCUMENTS

| 3,040,775 | 6/1962 | Ray ............................ 137/596.17 |
| 3,054,386 | 9/1962 | Bohnhoff . | |
| 3,424,281 | 1/1969 | Kawabe et al. ..................... 188/106 |
| 3,514,163 | 5/1970 | MacDuff .............................. 303/49 |
| 4,622,814 | 11/1986 | Kervagoret ......................... 60/555 |
| 4,641,894 | 2/1987 | Belart .................................. 303/114 |
| 4,693,521 | 9/1987 | Takata et al. ...................... 303/103 |

FOREIGN PATENT DOCUMENTS

| 2052307 | 5/1972 | Fed. Rep. of Germany . |
| 2657197 | 6/1978 | Fed. Rep. of Germany . |
| 2139491 | 1/1973 | France . |
| 2276522 | 1/1976 | France . |
| 435410 | 11/1974 | U.S.S.R. ......................... 251/129.21 |

Primary Examiner—Gerald A. Michalsky
Attorney, Agent, or Firm—Larry J. Palguta; Ken C. Decker

[57] ABSTRACT

The solenoid valve comprises a mounting base (1) having an inner projecting part (7) supporting an upper piece (14) via a tubular supporting piece (13), the assembly being joined together by way of a cover (21) crimped (26) on the mounting base. The plunger structure comprises a core of magnetizable material (31), sliding in a bore (15) in the upper piece (14), and a tubular extension piece (27) made of non-magnetic material and sliding in a bore (10) in the projecting part (7) of the base, inserts of various shapes (36; 41) being arrangeable in the base (1) and in the upper piece (14).

10 Claims, 2 Drawing Sheets

SOLENOID VALVE

This is a continuation of abandoned application Ser. No. 024,230 filed Mar. 10, 1987.

The present invention relates to solenoid valves of the type comprising a mounting base having a first axial bore, an upper piece having a second axial bore and supported on the base concentrically relative to the latter by means of a tubular supporting piece and held in position by means of a cover, a coil surrounding at least an axial portion of the upper piece, and a first and a second insert which are mounted respectively in the first and the second axial bores and which form stops for the axially opposite ends, forming valve means, of a plunger structure stressed elastically and having a fluid throughpassage, at least the first insert having an inner fluid passage opening into a valve seat which can be closed off by the adjacent valve means of the plunger structure.

A solenoid valve of this type is described in the document FR-A-No. 1,542,398. In this document, the upper piece forms the pole piece and is supported on the tubular supporting piece which forms the body of the solenoid valve and which, above the base, defines an inner cavity for a complex armature structure supported and guided by flat springs flanged peripherally in the supporting piece forming a body, in a fragile and costly arrangement.

It is therefore an object of the present invention to provide improvements to solenoid valves of this type which are of simplified design and are robust, reliable and accurate, while being suitable for large-scale production and allowing numerous modifications retaining a large number of common components with low manufacture and assembly costs.

To achieve this, according to one feature of the invention, the base made of a material having magnetic characteristics comprises an inner cylindrical part forming a pole piece, projecting axially into the coil towards the upper piece, and formed with a third bore co-axially relative to the first and second bores, the plunger structure comprising a cylindrical core made of magnetic material sliding in the first bore formed in the upper piece and interacting in engagement contact with a tubular extension piece made of non-magnetic material which has an inner fluid passage and which slides in the third bore formed in the inner projecting part of the base.

According to another feature of the invention, the tubular supporting piece is a tube made of non-magnetic material, in which are mounted sealingly the opposing ends of the upper piece and of the inner projecting part of the base, each of which typically has a peripheral annular gasket and a peripheral radial shoulder, with which the corresponding end of the supporting tube interacts as a stop, the assembly being locked in position by means of the cover consisting of a tubular piece which is made of a material having magnetic characteristics and has a bottom bearing against an outer shoulder of the upper piece and the free edge of which is crimped on the mounting base, thereby forming a closed loop for the magnetic flux.

Figure 2:
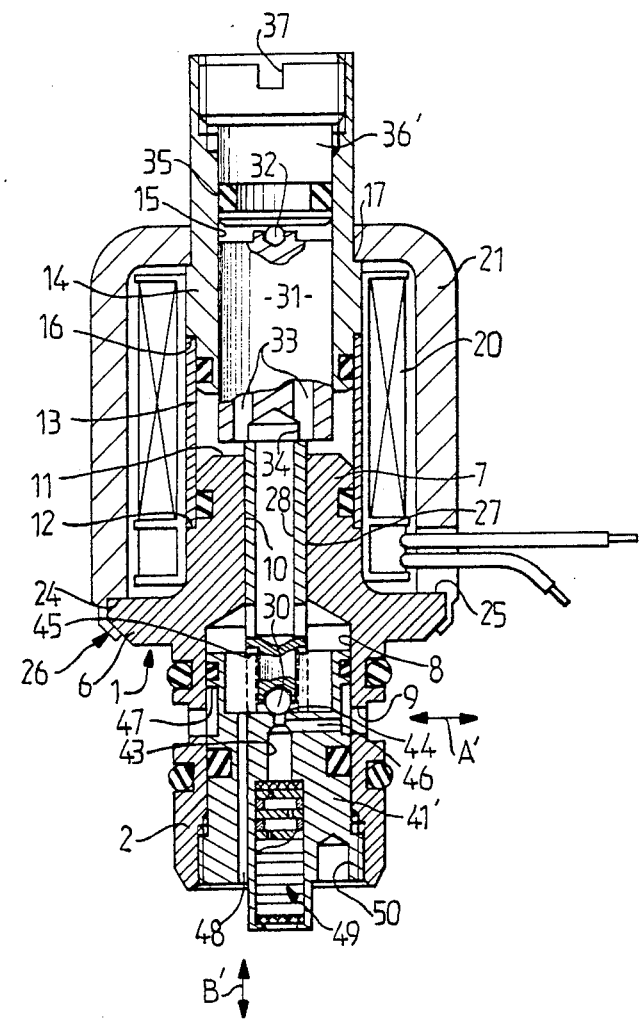

The invention will now be described by way of example with reference to the accompanying drawings in which:

FIG. 1 is a view in longitudinal section of a solenoid valve according to the invention, designed to form a solenoid cut-off valve; and FIG. 2 is a view in longitudinal section identical to that of FIG. 1, showing a solenoid valve according to the invention designed to form a three-way solenoid distributor valve.

In the following description and in the drawings, identical or similar elements bear the same reference numerals, if appropriate with an index.

As can be seen in FIG. 1, the solenoid valve according to the invention, comprises a mounting base, generally designated by the reference 1, having an outer tubular projecting part 2 intended to be engaged sealingly by means of gaskets, such as 3, in a well 4 of a distribution block 5 which has at least two fluid passages A and B opening into the well 4 at separate locations. According to the invention, the mounting base 1 comprises an intermediate assembly collar part 6 and a tubular projecting part 7 extending in the opposite direction to the outer tubular projecting part 2, the mounting base 1 being made of magnetic material, for example, pure iron. Formed inside the outer projecting part 2 is a first bore 8 defining an inner chamber, into which open, between the gaskets 3, radial ports 9 communicating with the fluid passage A. Formed in the inner projecting part 7 is a coaxial through-bore 10 of smaller diameter which opens into the first bore 8 and onto the perfectly plane annular end face 11 of the inner projecting part 7, on the outside of which is formed a radial annular shoulder 12 extending outwards. Fitted onto the end portion of the inner projecting part 7 is a supporting tube 13 made of nonmagnetic material, for example stainless steel, which interacts by means of its lower end with the shoulder 12. Fitted into the tube 13 is the cylindrical inner end of a tubular upper piece 14, inside which is formed an axial through-bore 15 and on the outside of which are formed a first radial annular shoulder 16 extending outwards, which, in the final assembled configuration, is intended to interact with the upper end of the tube 13, and a second radial annular shoulder 17 extending outwards, which, as will be seen later, is intended to interact with an assembly cover. The space inside the tube 13 between the inner projecting part 7 of the base 1 and the upper piece 14 is sealed off from the outside by means of annular gaskets 18 and 19 carried by the projecting part 7 and the upper piece 14. An electrical coil 20 is arranged around the inner end of the upper piece 14, the tube 13 and the inner projecting part 7 of the base 6. Fitted on the co-axial assembly formed in this way is a cover 21 which is made of a material having magnetic characteristics, typically mild steel, and which has a bottom part 22 provided with a central bore 23 engaged on the upper piece 14, so that the bottom part 22 is brought to bear against the shoulder 17, the free edge of the cylindrical part of the cover 21 having an annular shoulder 24 bearing on the raised upper face 25 of the collar part 6 of the base 1, and having a thinned end edge crimped on this collar part, as shown at 26, to ensure that the above-described elements of the solenoid valve are joined together.

According to one aspect of the invention, mounted slideably in the bore 10 of the inner projecting part 7 of the base 1 is a tubular piece 27 made of non-magnetic material, for example stainless steel or an aluminum alloy, and on the inside of which is formed, over some of its length, a blind axial bore 28 of an axial extension greater than the axial extension of the bore 10 and communicating with the outside, in the vicinity of its bottom part, via radial slots 29. The end of the tubular piece 27 opposite the mouth of the bore 28 and extending into the bore 8 carries a valve means 30 which typically consists of a ball crimped into the end of the tubular piece 27. A cylindrical core 31 made of a material having a high magnetic characteristic, for example pure iron, is mounted slideably in the bore 15 of the upper piece 14, a valve means 32 being formed at the upper end of the core 31, for example in the form of a crimped ball. Formed in the core 31 are at least one, but typically at least two axial channels 33 which open out on either side of the valve means 32 in the upper part of the core 31 and which advantageously communicate, in the lower part of the core 31, with an inner end chamber 34 opposite the mouth end of the blind bore 28 in the tubular piece 27.

Mounted sealingly by means of a gasket 35 in the upper end of the bore 15 in the upper piece 14 is a tubular insert 36 having an external thread interacting with an internal thread made in the upper end of the bore 15, the insert 36 having an end slot 37 allowing it to be screwed into the bore 15. In the embodiment illustrated in FIG. 1, the insert 36 has an axial through-passage 38 opening into the lower end of the insert 36 to form a valve seat 39 intended to interact with the adjacent valve means 32 formed at the upper end of the core 31. In a similar way, mounted sealingly by means of a gasket 40 in the bore 8 is an insert 41 which has an external thread interacting with an internal thread made in the lower end of the bore 8 and which is provided with a slot 42 allowing it to be screwed. In the embodiment shown in FIG. 1, the insert 41 is formed with an axial throughpassage 43 opening onto its upper end face to form a valve seat 44 intended to interact with the valve means 30 formed at the end of the tubular piece 27. A stressing spring 45 is mounted between the inner end face of the insert 41 and a peripheral shoulder of the tubular piece 27, so as to stress the latter up against the lower face of the core 31 and consequently stress this, via its valve means 32, up against the seat 39 in the inner end face of the upper insert 36. It will easily be appreciated that by adjusting each of the two inserts 36 and 41 separately it is possible to regulate accurately the air gap e between the end face 11 of the inner projecting part 7 of the base 1 and the adjacent accurately trued end face of the core 31, as well as the valve lift between the seat 44 of the insert 41 and the valve means 30 at the lower end of the tubular piece 27, irrespective of the production tolerances inherent in the component parts of the static assembly formed by the base 1, the tube 13, the upper piece 14 and the cover 21. It will also be noted that, however small the air gap e is set, the arrangement of the fluid passages 33, 34 and 28 allows a non-laminar flow of fluid between the bore 8 and the bore 15.

As mentioned above, the design according to the invention allows numerous modifications, while at the same time preserving the static assembly described above. Thus, FIG. 2 illustrates a modification of the solenoid valve described previously with reference to FIG. 1. In this alternative form shown in FIG. 2, the upper insert 36' is solid here, its inner end face merely serving as a support for the valve means 32 at the upper end of the core 31 for the purpose of regulating the solenoid valve. In contrast, here, the lower insert 41' has a transverse fluid passage portion 46 making communication between the central axial passage 43 opening into the valve seat 44 and a peripheral annular groove 47 communicating with the radial ports 9, and a second axial through-passage 48 opening directly into the inner chamber, formed by the bore 8 in the base 1, parallel to the first central axial passage 43 which typically has a labyrinth structure 49 in a widened end part. In this embodiment, the lower insert 41' has at least one orifice 50 for a tool allowing it to be screwed into the bore 8.

The solenoid valves according to the present invention, because of their smallness, their robustness and their short response time, have many uses, particularly in high-pressure systems, for example, in anti-lock brake circuits. In this case, the solenoid valve design according to FIG. 1 will be used as an isolating and pressure-reducing solenoid valve, the fluid under pressure flowing in via the passage B towards the valve seat 44, the passage A being connected to the operating circuit and the passage C, communicating with the valve seat 39, being connected to a low-pressure tank, and the solenoid valve design according to FIG. 2 will then be used as an isolating solenoid valve with a restriction formed by the labyrinth 49, and the passage A' communicating with the ports 9 will be connected to the above-mentioned passage A, while the outlet passage B', with which the passages 43 and 48 communicate, will be connected to the vehicle brakes.

I claim:

1. A solenoid valve comprising a mounting base having a first axial bore, an upper piece having a second axial bore and supported on the base concentrically relative to the base by means of a tubular supporting piece and held in position by means of a cover, a coil surrounding at least an axial portion of the upper piece, and a first insert and a second insert which are mounted respectively in the first axial bore and the second axial bore and which form stops for axially opposite ends, forming valve means, of a plunger structure stressed elastically and having a fluid through-passage, at least the first insert having an inner fluid passage opening into a valve seat which can be closed off by the adjacent valve means of the plunger structure, characterized in that the mounting base comprises an inner cylindrical part forming a pole piece projecting axially into the coil toward the upper piece and formed with a third bore coaxial relative to the first axial bore and second axial bore, the plunger structure comprising a cylindrical core sliding in the second axial bore and interacting in engagement contact with a tubular exension piece made of nonmagnetic material which has an inner passage and which slides in the third bore, the core comprising at least one axial passage communicating permanently with an adjacent end of the inner passage in the extension piece, the inner passage comprising a blind axial bore formed over some of the extension piece which has at least one radial passage in the vicinity of the end forming the adjacent valve means, the one axial passage communicating with a central axial end chamber aligned with the inner passage, and the core having a pair of parallel axial passages providing communication between the second insert and inner cylindrical part.

2. The sòlenoid valve according to claim 1, characterized in that the tubular supporting piece is a tube made of non-magnetic material in which is mounted sealingly opposing ends of the upper piece and inner cylindrical part of the base.

3. The solenoid valve according to claim 2, characterized in that the opposing ends of the upper piece and inner cylindrical part of the base each have a peripheral annular gasket and a peripheral radial shoulder, corresponding ends of the tube interacting as stops with the radial shoulders.

4. The solenoid valve according to claim 3, characterized in that the cover consists of a tubular piece made of magnetic material which has a bottom bearing against an outer shoulder of the upper piece and a free edge crimped on the mounting base.

5. The solenoid valve according to claim 1, characterized in that the valve has a spring which stresses the plunger structure and which is arranged between the extension piece and the first insert.

6. The solenoid valve according to claim 1, characterized in that the second insert has an inner fluid passage opening into a valve seat which can be closed off by the adjacent valve means of the plunger structure.

7. The solenoid valve according to claim 1, characterized in that the inner fluid passage of the first insert has a transverse passage portion which opens into a peripheral groove of the first insert communicating with a port formed in the base and opening into the first axial bore.

8. The solenoid valve according to claim 7, characterized in that the inner fluid passage of the first insert has an axial passage portion opening outside the first insert.

9. The solenoid valve according to claim 8, characterized in that the first insert has a labyrinth assembly arranged in the axial passage portion.

10. The solenoid valve according to claim 7, characterized in that the first insert has a second inner fluid passage.

* * * * *